US006722708B2

(12) United States Patent
Morohoshi et al.

(10) Patent No.: US 6,722,708 B2
(45) Date of Patent: Apr. 20, 2004

(54) TUBULAR RESIN CONNECTION STRUCTURE

(75) Inventors: Katsumi Morohoshi, Zama (JP); Hiroshi Kumagai, Yamato (JP); Tatsunobu Takeda, Ayase (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/194,234

(22) Filed: Jul. 15, 2002

(65) Prior Publication Data
US 2003/0030277 A1 Feb. 13, 2003

(30) Foreign Application Priority Data
Aug. 9, 2001 (JP) ........................ 2001-242006

(51) Int. Cl.$^7$ ................................ F16L 47/02
(52) U.S. Cl. ................ 285/423; 285/293.1; 285/285.1
(58) Field of Search ............... 285/290.1, 290.3, 285/290.4, 285.1, 21.2, 21.3, 293.1, 423

(56) References Cited

U.S. PATENT DOCUMENTS

| 2,378,901 | A | * | 6/1945 | Amrhein et al. | 285/293.1 |
| 4,174,125 | A | * | 11/1979 | Wyss | 285/423 |
| 4,330,016 | A | * | 5/1982 | Grendelman | 285/423 |
| 4,854,343 | A | * | 8/1989 | Rilett | 137/543.19 |
| 4,997,213 | A | * | 3/1991 | Traner et al. | 285/131.1 |
| 5,169,176 | A | * | 12/1992 | Brossard | 285/423 |
| 5,429,397 | A | * | 7/1995 | Kanao | 285/290.3 |
| 5,568,944 | A | * | 10/1996 | Kawasaki | 285/423 |
| 5,568,949 | A | * | 10/1996 | Andre | 285/285.1 |
| 5,931,510 | A | * | 8/1999 | Mathew et al. | 285/148.21 |
| 6,290,265 | B1 | * | 9/2001 | Warburton-Pitt et al. | 285/293.1 |
| 6,604,551 | B2 | * | 8/2003 | Nishi et al. | 138/137 |

FOREIGN PATENT DOCUMENTS

| EP | 289413 | * 11/1988 | 285/293.1 |
| JP | 60-52498 U | 4/1985 | |
| JP | 4-83992 A | 3/1992 | |
| JP | 4-42987 U | 4/1992 | |
| JP | 5-157190 A | 6/1993 | |
| JP | 5-318515 A | 12/1993 | |
| JP | 6-147387 A | 5/1994 | |
| JP | 6-265082 A | 9/1994 | |
| JP | 7-6587 U | 1/1995 | |
| JP | 9-189394 A | 7/1997 | |
| JP | 10-185070 A | 7/1998 | |
| JP | 2002-504980 A | 12/1998 | |
| JP | 11-141787 A | 5/1999 | |

* cited by examiner

Primary Examiner—David Bochna
(74) Attorney, Agent, or Firm—Shinjyu Global IP Counselors, LLP.

(57) ABSTRACT

A tubular resin connection structure is disclosed that includes a resin connector and a resin tube. The resin tube is fixedly coupled to one of the first and second ends of the resin connector in a fluid-tight manner by a weld disposed between the resin connector and the resin tube. Preferably, one end of the resin tube is inserted into a molding die and a portion of the resin connector is welded to the resin tube by overmolding the resin of the resin connector during injection molding. In other words, the weld between the resin connector and the resin tube is formed overmolding a resin of the resin connector over the resin tube to simultaneously mold the resin connector and form the weld between the resin connector and the resin tube.

13 Claims, 4 Drawing Sheets

TUBULAR RESIN CONNECTION STRUCTURE

BACKGROUND OF THE INVENTION

1. Field of the Invention

The present invention relates to a resin connector used for coupling a resin tube to another tube-shaped body in a fluid-tight manner in, for example, the fuel system piping of an automobile. More specifically, the present invention relates to a connection structure for a resin connector and a resin tube.

2. Background Information

Feed tubes, return tubes, evaporation hoses, filler hoses and other automobile fuel system piping have conventionally been made of metal, rubber, resin, or a combination of two or three of these. Recently in particular, piping items for which metal has been the mainstream are being switched over to resin because resin does not rust, enables weight reduction, and is advantageous in terms of cost. This kind of resin tube is usually connected to a resin connector before being connected to pipes and the like in order to facilitate ease of connection with the pipes.

One example of such a resin connector has a resin tube inserted on to a step-tapered tube mounting section of a resin connector with an O-ring disposed therebetween. Another tube-shaped body is connected the resin tube by the resin connector. An O-ring is disposed between the tube-shaped body and the resin connector for ensuring the fluid-tightness of the connection between the tube-shaped body and the resin connector.

The manufacturing process for the connection between the resin tube and the resin connector is troublesome in terms of positioning the components and setting the insertion stress. There is also the problem of permeation of small amounts of fuel and other fluids from the connection. It is expected that fuel permeation regulations will become increasingly strict and there will be a demand for materials and structures having lower permeation levels.

In order to reduce the aforementioned permeation of fluids, it is common to use one or two O-rings made mainly of fluoro rubber at the resin connector, as described above, so as to achieve fluid-tightness with respect to the resin tube being connected thereto. However, the use of O-rings makes it impossible to avoid an increase in the number of parts and is accompanied by increased cost.

In view of the above, there exists a need for an improved connection structure for a resin connector and resin tube. This invention addresses this need in the art as well as other needs, which will become apparent to those skilled in the art from this disclosure.

SUMMARY OF THE INVENTION

The present invention was conceived in view of the aforementioned problems associated with conventional resin connectors. One aspect of the present invention is to provide a connection structure for a resin connector and resin tube that can decrease manufacturing cost and reduce leakage of fuel and other fluids.

This aspect of the present invention is basically attained by providing a tubular resin connection structure includes a resin connector and a resin tube. The resin connector has a first end and a second end with a passage extending between the first and second ends. The resin tube is fixedly coupled to one of the first and second ends of the resin connector in a fluid-tight manner by a weld disposed between the resin connector and the resin tube.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
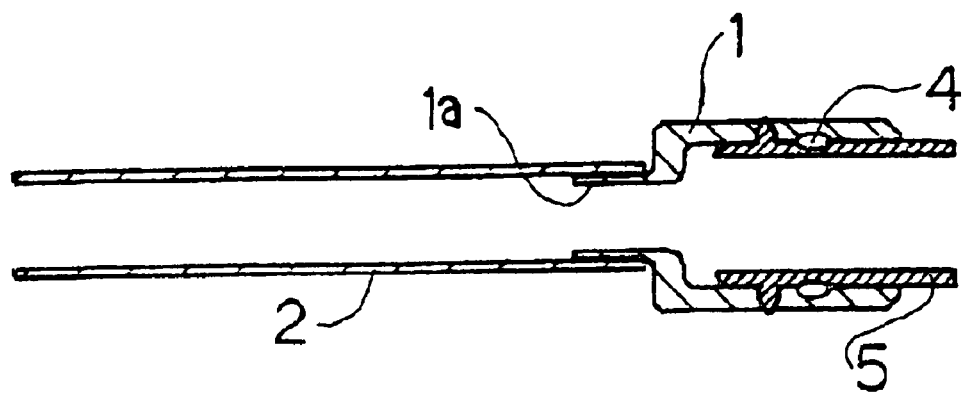
FIG. 1 is a cross sectional view of a connection structure for a resin connector and a resin tube in which the connector is welded to the inside layer of the tube in accordance with a first embodiment of the present invention.

Referring initially to FIG. 1, a tubular resin connection structure is illustrated in accordance with a first embodiment of the present invention. The tubular resin connection structure of the present invention includes a resin connector 1 and resin tube 2. The resin connector 1 is used for coupling the resin tube 2 to another tube-shaped body 5. The resin connector 1 has a first end and a second end with a passage extending between the first and second ends. The resin tube 2 is fixedly coupled to one of the first and second ends of the resin connector 1 in a fluid-tight manner by a weld disposed between the resin connector 1 and the resin tube 2. In other words, the resin connector 1 is coupled at the first end to the resin tube 2 by welding a portion of the resin connector 1 to a portion of the resin tube 2. The resin connector 1 is coupled at the second end to the tube-shaped body 5 in a conventional manner as shown.

As shown in FIG. 1, the resin tube 2 has a hollow center portion that fuel and other fluids can pass through. The resin tube 2 is connected to the resin connector 1 by welding the outside surface or outermost layer of the tube mounting section 1a of the resin connector 1 to the inside surface or innermost layer of the resin tube 2. The tube-shaped body 5 is connected the resin tube 2 by the resin connector 1 such that fuel and other fluids can pass through the resin tube 2, the resin connector 1 and the tube-shaped body 5. An O-ring 4 is disposed between the tube-shaped body 5 and the resin connector 5 for ensuring the fluid-tightness of the connection between the tube-shaped body 5 and the resin connector 1.

Figure 2:
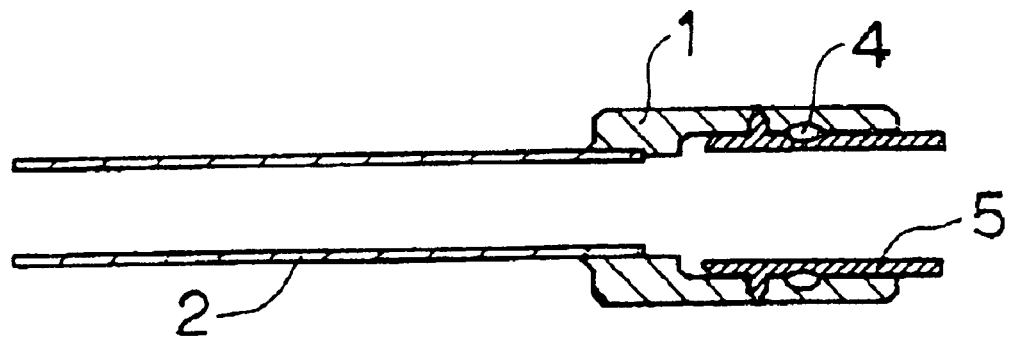
FIG. 2 is a cross sectional view of a connection structure for a resin connector and a resin tube in which the connector is welded to the outside layer of the tube in accordance with a second embodiment of the present invention.

As shown in FIG. 2, a tubular resin connection structure in accordance with second embodiment of the present invention is illustrated. In this arrangement, the resin tube 2 and the resin connector 1 are connected together by welding the resin connector 1 to the outside surface or outermost layer of the resin tube 2 as shown in FIG. 2. Welding to the outside surface or outermost layer of the resin tube 2 is preferred when the inside surface or layer of the resin tube 2 is made of a resin that is difficult to weld such as fluoro rubber.

Compared to the method described in the background, welding the resin connector 1 to the resin tube 2 enables connection of the resin connector 1 and the resin tube 2 to be accomplished easily without increasing the center positioning precision and allows stability of quality to be ensured because it is not necessary to set the insertion stress. Also, since the welding causes the resin that constitutes the resin connector 1 and the resin tube 2 to become a single integral, unitary structure, permeation of fuel and other fluids passing through the inside thereof can be prevented. Thus, the O-ring can be eliminated, and the material costs are reduced such that the resin connector 1 becomes an inexpensive item.

In the tubular resin connection structures shown in FIGS. 1 and 2, there are no particular limitations on the welding method used when the welding is conducted after the resin connector 1 has been molded into the desired shape. Such methods include, but not limited to, hot plate welding, vibration welding, and laser welding. Among these, hot plate welding is preferred because it is simple and allows good weld strength to be obtained with ease. To achieve even better weld strength, the welding can be conducted simultaneously with the molding of the connector by overmolding as explained below.

Figure 3:
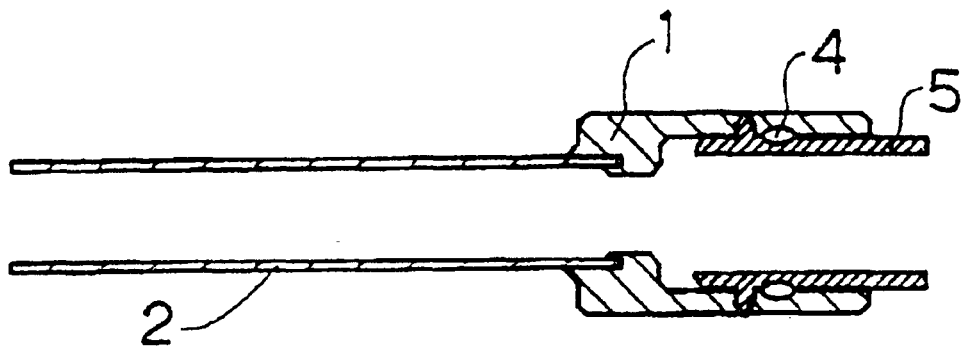
FIG. 3 is a cross sectional view of a connection structure for a resin connector and a resin tube in which the connector is welded to both the outside layer and inside layer of the tube in accordance with a third embodiment of the present invention.

As shown in FIG. 3, a tubular resin connection structure in accordance with third embodiment of the present invention is illustrated. In this arrangement, the resin that constitutes the resin connector 1 can be welded to both the outside surface or outermost layer and the inside surface or innermost layer of the resin tube 2. When the innermost layer of the resin tube 2 is a barrier layer for reducing fuel permeation, the amount of fluid permeation is lower than when only the outermost layer of the resin tube 2 is welded because the barrier layer of the resin tube 2 and the connector 1 become an integral unitary structure.

Figure 4:
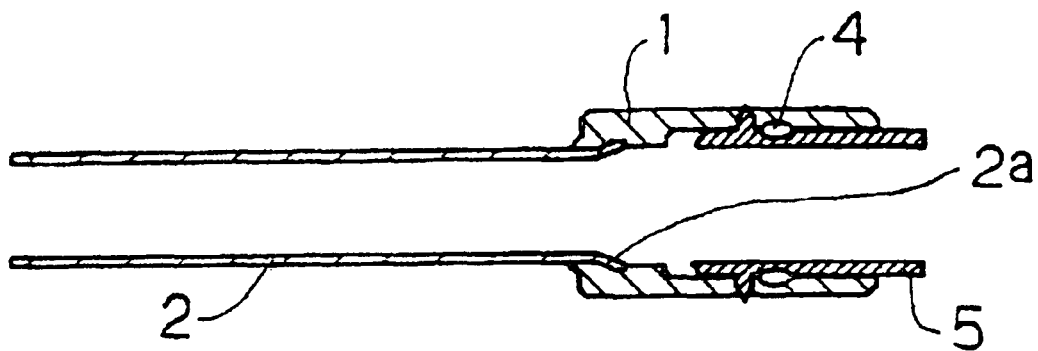
FIG. 4 is a cross sectional view of a connection structure for a resin connector and a resin tube in which the connector is welded to the outside layer of a tube whose connection end has been enlarged in diameter in accordance with a fourth embodiment of the present invention.

As shown in FIG. 4, a tubular resin connection structure in accordance with fourth embodiment of the present invention is illustrated. In this arrangement, the end of the resin tube 2 that is connected to the resin connector 2 is expanded to increase its diameter prior to overmolding. This enlarged diameter part 2a is now used connected to the resin connector 2 by overmolded. A similar effect to that of the connection structure shown in FIG. 2 is achieved but, in addition, higher yield strength with respect to tensile force is obtained because the enlarged diameter part 2a of the resin tube 2 serves as an anchor structure.

Figure 5:
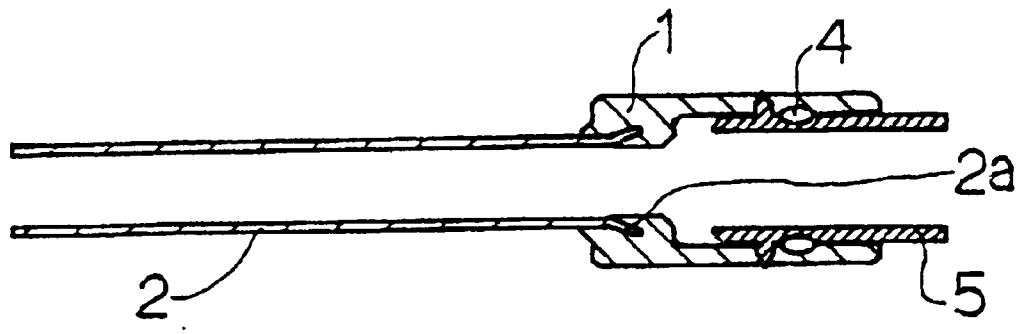
FIG. 5 is a cross sectional view of a connection structure for a resin connector and a resin tube in which the connector is welded to both the outside layer and inside layer of a tube whose connection end has been enlarged in diameter in accordance with a fifth embodiment of the present invention.

As shown in FIG. 5, a tubular resin connection structure in accordance with fifth embodiment of the present invention is illustrated. In this arrangement, the structure involves first enlarging the diameter of one end of the resin tube 2, similarly to the structure just described, and then welding/covering both the outside surface or outermost layer and the inside surface or innermost layer of the resin tube 2 with the resin that constitutes the resin connector 1, similarly to the connection structure shown in FIG. 3. In addition to the improved yield strength resulting from the anchor structure, this arrangement achieves a reduction in the amount of permeation similar to that of the connection structure shown in FIG. 3.

Next, some of the methods of welding the resin connector 1 and the resin tube 2 together or molding the resin connector 1 in order to obtain the previously described connection structures will be explained in detail.

The connection structures shown in FIGS. 1 to 5 can be obtained by welding a previously molded resin connector 1 and the resin tube 2 using any one of the following: hot plate welding, vibration welding, ultrasonic welding, etc. However, hot plate welding or the overmolding method shown in FIGS. 6 and 7 are improved methods for achieving high weld strength and low variation of product quality; it is preferable to use either of these methods.

Figure 6:
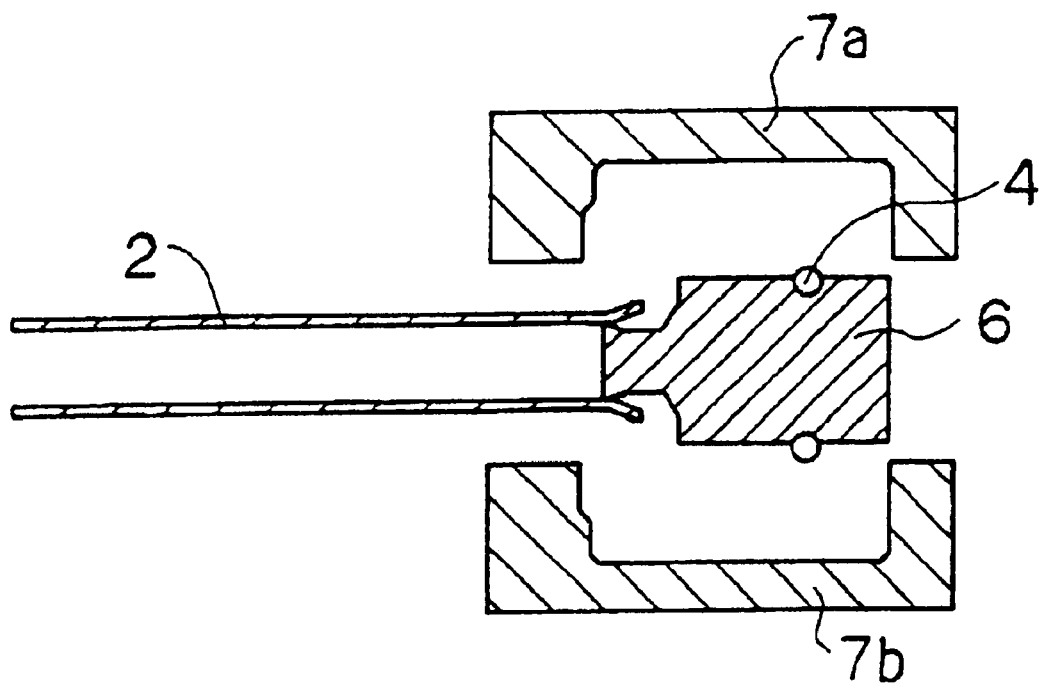
FIG. 6 is an exploded cross sectional view of a resin tube and injection molding dies used for overmolding a resin connector on to the resin tube in accordance with one exemplary configuration of the present invention.

FIG. 6 shows an overmolding die structure for obtaining the connection structure shown in FIG. 5. The die structure comprises an internal die 6 and a pair of external dies 7a and 7b that can be opened and closed about the internal die 6. The resin tube 2 whose end has already been enlarged in diameter is set onto the internal die 6 and the external dies 7a and 7b are closed over the resin tube 2.

Figure 7:
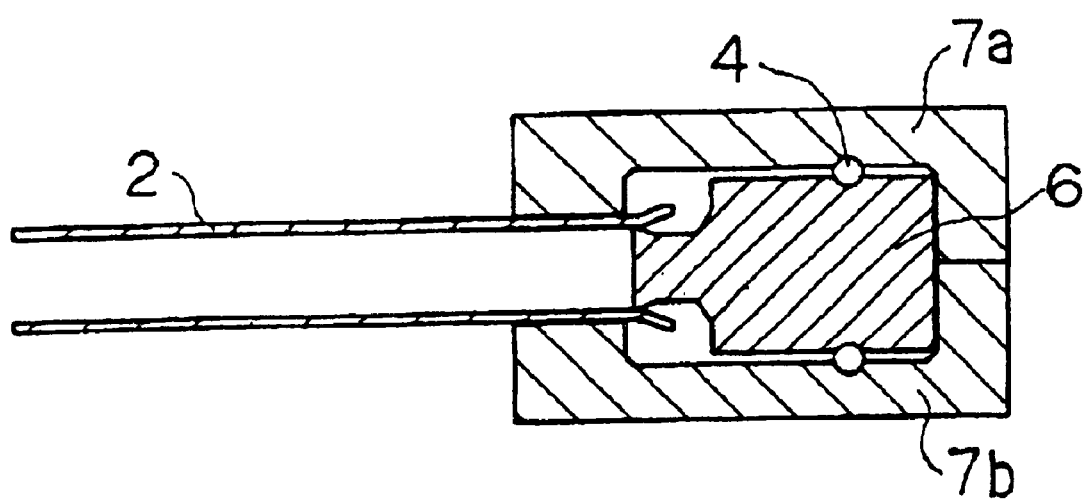
FIG. 7 is a cross sectional view of the resin tube and the injection molding dies shown in FIG. 6 in which the external dies of the injection molding dies are closed for overmolding the resin connector on to the resin tube.

When necessary, an O-ring 4 is also installed onto the internal die 6 (in addition to setting the resin tube 2 onto the internal die 6) before closing the external dies 7a and 7b as shown in FIG. 7. Then, by injecting the resin that constitutes the resin connector 1, the resin connector 1 is molded and simultaneously welded to the resin tube 2. In other words, the welded connection between the resin connector 1 and the resin tube 2 is accomplished simultaneously with the molding of the resin connector 1. In this manner, a connection structure for the resin connector 1 and the resin tube 2 in accordance with the present invention can be easily obtained. Moreover, it is also acceptable to provide a slide mechanism on the internal die 6 shown in FIG. 6.

Next, the resin material used in the present invention will be described. It will be apparent that the resin materials, discussed below for the resin connector 1 the resin tube 2 applies to all embodiments of the present invention. First, it is preferable to select a resin to be used for the resin connector 1 based on the resin used for the resin tube 2. For example, if the resin tube 2 is made of polyamide 12, then the best connector material in terms of weld strength will be the same resin, i.e., polyamide 12, or polyamide 12 reinforced with glass fiber or the like.

The welding compatibility between the resin materials serves as a yardstick of the weld strength in a connection structure in accordance with the present invention. In addition to the aforementioned polyamide, other possible resin materials for the connector include polyolefin denatured with maleic acid. However, in terms of improving the resistance to fuel permeation, the use of such non-olefin based resins as the aforementioned polyamide 12 or polyamide 12 reinforced with glass fiber are preferred over olefin based resins.

Furthermore, when the material constituting the resin tube 2 is polyamide 6, then polyamide 6 or the polyamide 6 reinforced with glass fiber or the like is a suitable material for the resin connector 2.

Also, when polyester elastomer (TPEE) is selected as the material for the resin tube 2, it is preferable to use TPEE or TPEE reinforced with glass fiber or the like as the material for the resin connector 1 as well. Alternatively, to reduce the amount of permeation from the resin connector 1, it is even more preferable to use polybutylene terephthalate (PBT) or a reinforced version of the same because of its high welding compatibility with TPEE.

When both the inside surface or innermost layer and the outside surface or outermost layer of the resin tube 2 are made of the same type of resin, e.g., a polyamide or a polyester, it is possible to select a connector material that is easy to weld to both the innermost layer and the outermost layer. Consequently, a higher weld strength, and thus, an even more preferable structure can be achieved by adopting a connection structure in which both the innermost layer and the outermost layer are welded as shown in FIG. 3 or 5.

Recently, fuels containing alcohol are coming into use and generating a demand for connectors with a high resistance against permeation of alcohol-containing fuels and reduced permeation amounts. It has been discovered that polyamides tend to allow large amounts of permeation because of their high affinity with alcohol. From this viewpoint and also in terms of cost, polybutylene terephthalate (PBT) or PBT reinforced with glass fiber or the like is a preferable material for the connector. Furthermore, in such a case, it is preferable to use TPEE as the material for the resin tube 2 from the standpoint of weldability, i.e., welding compatibility.

When fuel permeation resistance performance superior to that of PBT is required, resins that do not lose their welding compatibility can be blended. For example, the permeation resistance can be improved by blending homopolyester resins having a hexane ring or naphthalene ring (e.g., polybutylene naphthalate (PBN), poly 1,4 cyclohexylene dimethylene terephthalate (PCT), and liquid crystal polyester) and/or copolymer polyesters having a hexane ring (e.g., co-P(ED/CT)).

Also, if necessary, heat resistance and hydrolysis resistance can be imparted using fillers and electrical conductivity can be imparted to the resin material by blending conductive fillers or the like into the resin. In particular, streaming electrostatic charge becomes a problem when a fuel is allowed to flow through a tube, but this problem can be solved easily by using a resin having electrical conductivity for the resin connector 1 and the inside layer of the resin tube 2.

EXAMPLES

Below, the present invention is described in even further detail based on examples. However, the present invention is not limited to these examples.

Example 1

A resin connector made of polyamide 12 reinforced with glass fiber was welded with hot plates to a triple-layered resin tube having an outermost or outside layer made of polyamide 12, an intermediate or middle layer made of an adhesive, and an innermost or inside layer made of ethylene-tetrafluoroethylene copolymer (ETFE). The hot plates were applied to the outside layer of the resin tube and the inside surface of the resin connector 1. A connection structure like that shown in FIG. 2 was obtained.

Example 2

One end of a triple-layered tube, the same as that in Example 1, was inserted into a die and overmolded with polyamide 12 reinforced with glass fiber. The outside layer of the resin tube was welded to the inside surface of the resin connector to obtain a connection structure for a connector and a tube like that shown in FIG. 2.

Example 3

One end of a double-layered tube having an outside layer made of a polyester elastomer copolymer (TPEE: Hytrel 5577 made by Dupont-Toray Co., Ltd.) and an inside layer made of polybutylene terephthalate (PBT: 5201-X10 made by Toray Industries, Inc.) was inserted into a die and overmolded with PBT reinforced with fiber. The outside layer of the resin tube and the internal surface of the resin connector were welded to obtain a connection structure for a connector and a tube like that shown in FIG. 2.

Example 4

A connection structure for a connector and a tube like that shown in FIG. 2 was obtained using the same conditions as those described in Example 3, except that the die was designed to weld both the outside layer and the inside layer of the resin tube to the connector.

Example 5

A connection structure for a connector and tube like that shown in FIG. 5 was obtained using the same conditions as those described in Example 4 except that the external diameter of the end of the resin tube inserted into the die was enlarged 1.5 times.

Comparative Example

A connector made of polyamide 12 reinforced with glass fiber was coupled as shown in FIG. 2 to a triple-layered tube having an outside layer made of polyamide 12, an intermediate layer made of an adhesive, and an inside layer made of ethylene-tetrafluoroethylene copolymer (ETFE) by inserting the resin tube into the tube mounting section of the connector. The diameter of the inserted end of triple-layered tube was enlarged 1.5 times in advance and the end was inserted at room temperature and normal atmospheric pressure such that the inside surface of the resin tube contacted the outside surface of the tube mounting section of the connector. Also, a fluoro rubber O-ring was installed between the inside surface of the resin tube and the outside surface of the tube mounting section.

Performance Evaluation

The strength of each of the connection structures obtained in Examples 1 to 5 and the comparative example was evaluated by measuring the load required to pull the tube out of the resin connector, i.e., the withdrawal strength. The resistance performance against fuel permeation was also evaluated by enclosing an imitation fuel comprising isooctane, toluene, and ethyl alcohol at a ratio of 45:45:10 (volume ratio) inside the resin tube, closing the other end of the tube with a metal stopper, and measuring the fuel permeation from the connector under an ambient temperature of 40° C.

The results are shown in Table 1. The fuel permeation resistance performance results are shown in Table 1 as relative evaluations with respect to the comparative example. Results superior to comparative example are indicated with the mark (○) and those equivalent to the comparative example are indicated with the mark ○.

As explained heretofore, a connection structure for a resin connector and resin tube in accordance with the present invention is characterized by a portion of the resin connector being welded to the resin tube and therefore provides some excellent effects. The connection structure exhibits high resistance to permeation even against alcohol-containing

TABLE 1

| Category | Tube Configuration | | | Connector Material | Tube Welding Location | Welding Method | Permeation Resistance Performance (Alcohol-Containing Fuel) | Withdrawal Strength (N) |
|---|---|---|---|---|---|---|---|---|
| | Outside Layer | Middle Layer | Inside Layer | | | | | |
| Example 1 | PA12 | Adhesive | ETFE | Glass fiber reinforced PA12 | Outside Layer | Hot plate welding | ○ | 800 |
| Example 2 | PA12 | Adhesive | ETFE | Glass fiber reinforced PA12 | Outside Layer | Overmolding | ○ | 1050 |
| Example 3 | TPEE | — | PBT | Glass fiber reinforced PBT | Outside Layer | Overmolding | (○) | 1100 |
| Example 4 | TPEE | — | PBT | Glass fiber reinforced PBT | Outside and Inside Layers | Overmolding | (○) | 1150 |
| Example 5 | TPEE | — | PBT | Glass fiber reinforced PBT | Outside and Inside Layers | Overmolding With Enlarged Tube End | (○) | 1300 |
| Comparative Example | PA12 | Adhesive | ETFE | Glass fiber reinforced PA12 | — | (Insertion) | — | 760 |

As is clear from the results shown in Table 1, the connection structures obtained in Examples 1 to 5 were all found to have equal or better characteristics than the comparative example, thus confirming the effectiveness of connection structures constructed in accordance with the present invention. The examples just presented demonstrated excellent permeation resistance performance even though they were not installed with an O-ring for preventing permeation.

The present invention was explained in detail based on examples, but the present invention is not limited to these examples. A variety of modifications are possible so long as they do not depart from the gist of the invention. For example, the following items can be added alone or in an appropriate combination to the resin material used in the connection structure for a connector and tube of the present invention: an oxidation prevention agent and thermal stabilizing agent (e.g., hindered phenol, hydroquinone, thioether, a phosphite, or a combination of these); a UV radiation absorbing agent (e.g., resorcinol, salicylate, benzotriazole, benzophenon); a lubricant and release agent (e.g., silicon resin, montan acid or a salt thereof, stearic acid or a salt thereof, stearyl alcohol, stearyl amide); a coloring agent containing dyes (e.g., nitrosine) and pigments (e.g., cadmium chloride, phthalocyanine); a liquid impregnated with an additive (e.g., silicon oil); and a crystal nucleating agent (e.g., talc, kaolin).

Although the cross sectional shape of the resin tube 2 is typically circular or elliptical, it is also acceptable for other cross sectional shapes to be used. Furthermore, it is acceptable for the resin tube 2 to be a blow molded, corrugated, bellows-shaped tube, which is easy to manufacture by extrusion.

fuels, has excellent tube withdrawal strength, and provides an inexpensive connector by reducing the material cost and manufacturing cost of the connector.

Moreover, terms that are expressed as "means-plus function" in the claims should include any structure that can be utilized to carry out the function of that part of the present invention. Preferably, in the tubular resin connection structure in accordance with the present invention, fluid conveying means comprises the resin tube 2 and connector means comprises the resin connector 1. Moreover, the resin weld means preferably comprises the internal die 6 and the external dies 7a and 7b.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2001-242006. The entire disclosure of Japanese Patent Application No. 2001-242006 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A tubular resin connection structure comprising:

a resin connector having a first end and a second end with a passage extending between the first and second ends; and a resin tube fixedly coupled to one of the first and second ends of the resin connector in a fluid-tight manner by a weld disposed between the resin connector and the resin tube, the resin tube having an outermost layer that is a polybutylenes terephthalate copolymer, the resin connector having an inside surface and an outside surface welded to an innermost layer and the outermost layer of the resin tube by the weld, respectively.

2. The tubular resin connection structure as recited in claim 1, wherein the weld between the resin connector and the resin tube is formed by overmolding a resin of the resin connector over the resin tube to simultaneously mold the resin connector and form the weld between the resin connector and the resin tube.

3. The tubular resin connection structure as recited in claim 1, wherein the resin connector includes a resin having a welding compatibility with a resin of the outermost layer of the resin tube.

4. The tubular resin connection structure as recited in claim 1, wherein the resin connector includes a resin composition comprising an inorganic material mixed with a resin having a welding compatibility with a resin of at least the outermost layer of the resin tube.

5. The tubular resin connection structure as recited in claim 1, wherein the resin connector includes a resin welded to a resin of at least one of the outermost layer and an innermost layer of the resin tube by the weld.

6. The tubular resin connection structure as recited in claim 1, wherein the resin tube has an end section coupled to the resin connector, the end section having an enlarged diameter relative to an exterior section of the resin tube that extends from the end section out of the resin connector.

7. The tubular resin connection structure as recited in claim 1, wherein the resin connector including a resin having at least one of a polybutylene terephthalate and a polybutylene terephthalate reinforced with glass fiber.

8. A tubular resin connection structure comprising:

a resin connector having a first end and a second end with a passage extending between the first and second ends; and a resin tube fixedly coupled to one of the first and second ends of the resin connector in a fluid-tight manner by a weld disposed between the resin connector and the resin tube, the resin tube having an outermost layer that is a poly butylenes terephthalate copolymer, the resin tube having an end section coupled to the resin connector, the end section having an enlarged diameter relative to an exterior section of the resin tube that extends from the end section out of the resin connector, the end section of the resin tube has an innermost layer welded to an inside surface of the resin connector and the outermost layer welded to an outside surface of the resin connector by the weld, respectively.

9. The tubular resin connection structure as recited in claim 8, wherein the weld between the resin connector and the resin tube is formed by overmolding a resin of the resin connector over the resin tube to simultaneously mold the resin connector and form the weld between the resin connector and the resin tube.

10. The tubular resin connection structure as recited in claim 8, wherein the resin connector includes a resin having a welding compatibility with a resin of the outermost layer of the resin tube.

11. The tubular resin connection structure as recited in claim 8, wherein the resin of the resin connector includes a resin composition comprising an inorganic material mixed with a resin having a welding compatibility with a resin constituting at least the outermost layer of the resin tube.

12. The tubular resin connection structure as recited in claim 8, wherein the resin connector including a resin having at least one of a polybutylene terephthalate and a polybutylene terephthalate reinforced with glass fiber.

13. A tubular resin connection structure comprising:

fluid conveying means for conveying a fluid therethrough, said fluid conveying means being formed of a first resin;

connector means for fluidly coupling the fluid conveying means to another fluid conveying means, said connector means being formed of a second resin; and resin weld means for fixedly coupling the connecting means to said fluid conveying means in a fluid-tight manner by welding of the first and second resins together to form a single integral, unitary structure therebetween, said fluid conveying means having an outermost layer that is a polybutylene terephthalate copolymer the connector means having an inside surface and an outside surface welded to an innermost layer and the outermost layer of the fluid conveying means by the weld, respectively.

* * * * *